United States Patent [19]

Lindner et al.

[11] Patent Number: 4,539,589
[45] Date of Patent: Sep. 3, 1985

[54] IMAGE STABILIZED ROTATIONAL MODULATOR FOR PYROELECTRIC IMAGING DEVICES

[75] Inventors: Robert W. Lindner, Caldwell; Lucio M. Vallese, deceased, late of Glen Ridge, both of N.J., Eleanor R. Vallese, executrix

[73] Assignee: Electrophysics Corporation, Nutley, N.J.

[21] Appl. No.: 353,827

[22] Filed: Mar. 2, 1982

[51] Int. Cl.³ .............................................. H04N 3/08
[52] U.S. Cl. ..................................... 358/113; 250/330
[58] Field of Search ........................ 358/113, 125, 87; 250/330, 334; 313/388, 380

[56] References Cited

U.S. PATENT DOCUMENTS 3,786,269 1/1974 Cooper ............................... 250/334
3,889,117 6/1975 Shaw, Jr. ............................. 358/113

Primary Examiner—John C. Martin
Assistant Examiner—Edward L. Coles
Attorney, Agent, or Firm—Lahive & Cockfield

[57] ABSTRACT

Infrared radiation onto a pyroelectric vidicon TV camera is converted to a stable visible image by recourse to a rotational modulator which rotates the pyroelectric vidicon target with respect to the incoming radiation, about the rotational symmetry axis of the said target, without rotating the readout electron beam of the vidicon. The rotational motion may be continuous or cyclically reversible. Electronic assemblies may be rotated with the vidicon tube in order to simplify electrical contact means.

8 Claims, 2 Drawing Figures

IMAGE STABILIZED ROTATIONAL MODULATOR FOR PYROELECTRIC IMAGING DEVICES

BACKGROUND OF THE INVENTION

The technical field of this invention is pyroelectric imaging devices and, in particular, image modulators for such devices.

It is well known that pyroelectric type detectors exhibit an output signal proportional to the rate of change of the input radiation rather than to the value of such radiation. As a result, in order to obtain detection of time-invariant radiation, it is necessary to modulate the latter. This is done by panning the detector with a cyclic vibratory motion or by interposing a time varying optical beam deflector or by chopping the input radiation. In the case of imaging pyroelectric devices such as TV Cameras with pyroelectric target vidicon tubes, the above techniques have been applied by panning the Camera, by mechanically orbiting an optical element, such as a wedge, a lens, a plate, or by chopping the radiation beam. The final image generated by the camera also varies in time, i.e. it is cyclically displaced in accordance with the panning motion, or with the orbiting motion, or it is time-modulated in accordance with the chopping action. Various techniques have been used in order to produce an image stable in space and time. For example, in panning and in orbiting, cancellation of the image motion is obtained by introducing opposite motion by means of suitable electronic controls; in chopping, cancellation is obtained by introducing complementary image modulation or by recourse to storage techniques, etc. These approaches add complexity and cost to the camera design and reduce its reliability; in the case of chopping, the efficiency is lowered, because only a fraction of the incoming radiation is permitted to reach the detector.

The present invention provides modulation of the target input radiation beam without corresponding displacement or time variation of the camera image. As a result, a stable image is obtained with maximum efficiency and minimum complexity. The invention consists of imparting an axial rotatory motion to the vidicon tube or to the vidicon tube and electronic assembly, exclusive of the yoke assembly, about the rotational symmetry axis of the vidicon tube. An image is generated because of the relative motion between radiation beam and vidicon-tube target; however, since the scanning electronic beam within the vidicon, which depends on the electromagnetic yoke action, does not rotate, the video image remains stable. At the center point of the vidicon target, which does not have, an image is not generated; however, the area involved is very small and the resultant effect on the final image is negligible. The rotatory motion may be continuous or alternating; in the latter case the image is dissolved momentarily at the rotation reversals.

SUMMARY OF THE INVENTION

In the present invention an electric motor is connected axially to the vidicon tube, such that a rotatory motion, continuous or alternating, around the axis of rotational symmetry of the vidicon target is imparted to the vidicon tube or to the vidicon tube and electronic assembly, but not to the magnetic yoke assembly. Since the scanning electron beam of the vidicon does not rotate when the yoke assembly is fixed, the video image does not rotate. All or part of the other electronic assemblies, such as video amplifier, pulse generator and sync components, power supply components, may be rotated with the vidicon tube. In the case of continuous motion, the input and output voltage means for the operation of the vidicon tube or of the vidicon tube and electronic assemblies may be provided by means of conventional contacts such as metal-cylinder-brush contacts or metal-cylinder-rotating contacts; in the case of alternating rotatory motion, the input and output current and voltage means may consist of conventional flexible wires. The invention is simple and reliable and is not restricted with respect to the type of electric motor used, i.e. a-c or d-c type, or to the speed of the same, or to the period of the alternating rotatory motion. However, in practice optimum design values would be selected. As an example, the motor type would be selected on the basis of minimum electric interference with the TV camera operation, the motor speed would be selected large enough so that a response is obtained from the vidicon target material and low enough so that mechanical vibrations of the vidicon target are minimized. As example, in practical cases the motor speed may be selected between 2 revolutions per minute and 20 revolutions per minute; however other values may be selected depending on design circumstances.

BRIEF DESCRIPTION OF THE DRAWINGS

In the accompanying drawings, forming a part hereof, similar parts have been given the same reference numerals in which drawing

DETAILED DESCRIPTION OF THE PREFERRED EMBODIMENTS

Figure 1:
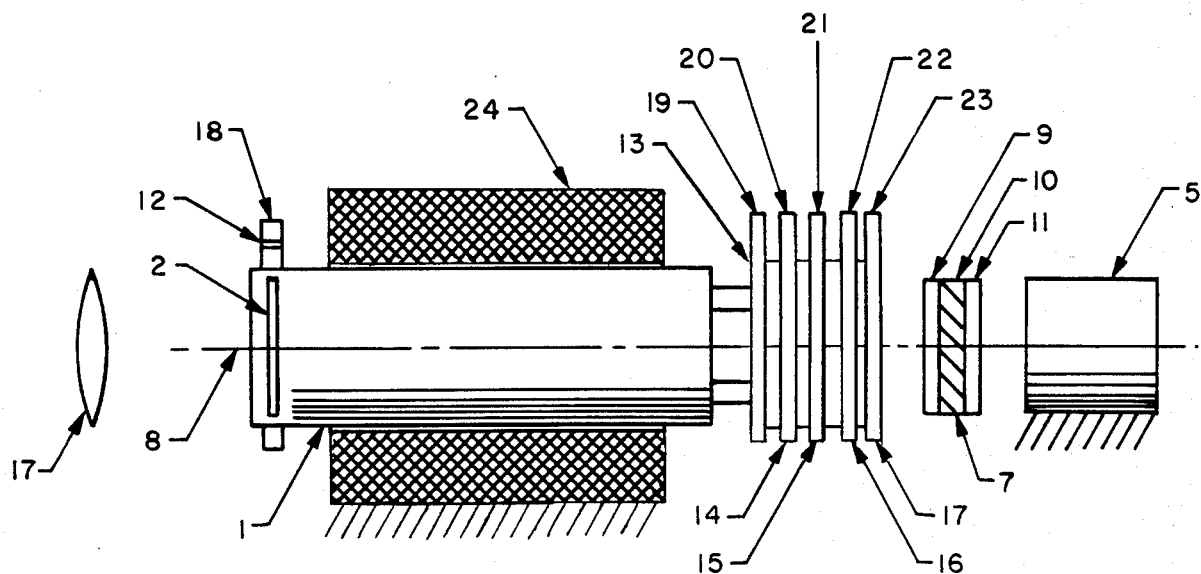
FIG. 1 is a complete embodiment of the continuous rotation system.

Referring to the drawings, motor means 5 are coupled to the vidicon tube 1 about the rotational symmetry axis of the latter 8 by means of elastic coupling means 7, consisting for example, of two solid parallel plates 9 and 11 joined together by means of a rubber membrane 10. The electrical contacts to the various electrodes of the vidicon tube, consisting of the target 2, cathode K1, grids G1/G2/G3/G4 and heater H1 and H2 are connected respectively to metal rings, 12, 13, 14, 15, 16 and 17. It should be noted that in general grids G2, G3 and G4 are electrically interconnected through a voltage divider network, which is mounted onto the vidicon tube socket; for this reason, the group of grids G2, G3 and G4 may be supplied by means of a single metallic ring. Electrical contacts means 18, 19, 20, 21, 22 and 23 of brush type or of rotatory type are provided. When the device is turned-on, the motor means rotate the vidicon 1 continuously, while the yoke 24 remains at rest. It should be noted that the number of electrical contacts required for the operation of the camera may be reduced if electronic assemblies such as video amplifier, sync generator, power supply components are rotated with the vidicon tube. Therefore, the embodiment shown in FIG. 1 is provided only as an example of realization.

Figure 2:
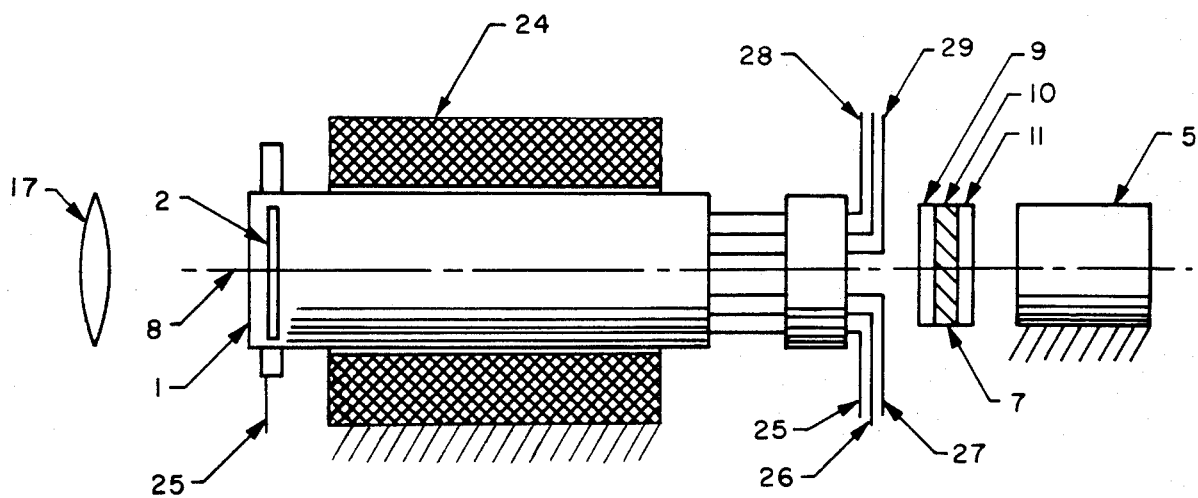
FIG. 2 is a complete embodiment of the alternating rotation system.

Referring to FIG. 2, the motor means 5 are coupled in the same manner as in FIG. 1, but they provide an alternating rotational motion with an angle of travel less than 360 degrees. The electrical contacts 25, 26, 27, 28 and 29 consist of flexible wire means. The alternating motion is obtained be reversing periodically the rotational direction of the motor with conventional means. Again, the number of flexible wire means may be reduced if electronic assemblies such as video amplifier, sync generator and power supplies are rotated together with the vidicon tube.

It is evident from the above description that the disclosed arrangement provides the required relative motion between radiation beam and vidicon target for the generation of the thermal video image and at the same time maintains a stable output video image. The resulting design of the TV camera is very simple and does not require image stabilization means that previous methods do.

Having thus fully described the invention what is claimed as new and desired to be secured by Letter Patent of the United States is:

1. In a pyroelectric device having an image plane and means for focusing radiation onto the image plane to form a thermal image, the improvement comprising:

a planar, two-dimensional, pyroelectric target positioned at the image plane for generating a charge distribution pattern corresponding to the thermal image, the target having a rotation axis perpendicular to the image plane and having rotational symmetry about said axis such that said thermal image is independent of said target's rotation about said axis;

scanning electron beam means for generating a signal responsive to the charge distribution of the target; and means for rotating the target about its rotational symmetry axis and relative to the scanning electron means, whereby the charge distribution pattern on the target is modulated and the signals generated by the scanning electron means are thereby representative of the thermal image.

2. The device of claim 1 wherein the rotational means is an electric motor.

3. The device of claim 1 wherein the rotational means rotates continuously.

4. The device of claim 1 wherein the rotational means is cyclically reversible.

5. The device of claim 1 wherein the device further comprises video circuitry electrically connected to scanning means, the circuitry being adapted to generate a video signal suitable for viewing on a cathode ray tube viewing means.

6. The device of claim 5 wherein at least part of the video circuitry is mechanically coupled to the rotational means and rotates therewith.

7. The device of claim 1 wherein the focusing means is mechanically coupled to the rotational means and rotates therewith.

8. The device of claim 1 wherein the focusing means is held stationary relative to the rotational means.

* * * * *